United States Patent [19]

Greaves et al.

[11] 4,432,879
[45] Feb. 21, 1984

[54] TREATMENT OF AQUEOUS SYSTEMS

[75] Inventors: Brian Greaves; Paul Ingham, both of Runcorn, England

[73] Assignee: Dearborn Chemicals, Ltd., Widnes, England

[21] Appl. No.: 297,525

[22] Filed: Aug. 28, 1981

Related U.S. Application Data

[63] Continuation of Ser. No. 194,033, Oct. 6, 1980, abandoned.

[30] Foreign Application Priority Data

Oct. 23, 1979 [GB] United Kingdom ................ 7936773

[51] Int. Cl.$^3$ ................................................ C02F 5/14
[52] U.S. Cl. .................................... 210/699; 210/701; 252/180
[58] Field of Search ............................... 210/698–701; 252/180, 181; 422/15, 17

[56] References Cited

U.S. PATENT DOCUMENTS

| | | | |
|---|---|---|---|
| 3,806,367 | 4/1974 | Lange et al. | 210/701 |
| 3,886,204 | 5/1975 | Geffer et al. | 210/699 |
| 3,890,228 | 6/1975 | Hwa et al. | 210/699 |
| 4,048,066 | 9/1977 | Cuisia et al. | 210/701 |
| 4,118,318 | 10/1978 | Welder et al. | 210/700 |
| 4,209,398 | 6/1980 | Ii et al. | 210/699 |
| 4,255,259 | 3/1981 | Hwa et al. | 210/699 |

FOREIGN PATENT DOCUMENTS

| | | | |
|---|---|---|---|
| 1234320 | 6/1971 | United Kingdom . | |
| 1463173 | 2/1977 | United Kingdom . | |
| 1534596 | 12/1978 | United Kingdom | 210/701 |
| 2023121 | 12/1979 | United Kingdom | 252/180 |

*Primary Examiner*—Peter A. Hruskoci

[57] ABSTRACT

Sludge is dispersed in cooling water systems by means of a combination of 2-phosphonobutane-1,2,4-tricarboxylic acid and a water soluble organic polymer possessing carboxylic and sulfonate groups.

6 Claims, No Drawings

TREATMENT OF AQUEOUS SYSTEMS

This is a continuation of application Ser. No. 194,033, filed Oct. 6, 1980, now abandoned.

The present invention relates to the treatment of aqueous systems, and, more particularly, to reducing or preventing the deposition of solid particles in cooling water systems.

It is well known that particles of solid matter including clay, silt, microbiological debris, ferric oxide and calcium carbonate deposit in aqueous systems and, in particular, in cooling towers and associated equipment. Such deposits greatly retard the transfer of heat not only by limiting the circulation of water but by insulating it from the surface it is intended to cool. A further effect is that serious corrosion may occur under any deposits formed; such corrosion is minimized by keeping the metal surfaces clean. Apart from deposition of hardness salts, particulate matter is introduced into a cooling system, for example, by the passage of large volumes of air through the cooling tower, and in the process the finely divided solids are effectively scrubbed out of the air.

A similar but even more severe situation exists in cooling and scrubbing the gases formed during steel making where large amounts of lime and iron oxide particles are carried over into the aqueous cooling and quenching system. This gives rise to a cooling water which is high in hardness-forming cations and particulate solid levels. An extremely efficient dispersant is required to operate under these conditions. Accordingly it is highly desirable that some way be found to disperse such particles so as to prevent particle deposition. It is to be appreciated that this is a different problem from the inhibition of scale where certain dissolved salts in the water precipitate or crystallize out or in some cases are deliberately caused to precipitate by the addition of, for example, phosphates and the resulting precipitate or sludge is conditioned so that it can readily be removed rather than adhere to the walls of the vessel.

The use of a variety of polycarboxylates and other low molecular weight polymers, including acrylate polymers, as dispersants in such water systems has been known for many years. It is well recognized, however, that these materials suffer a considerable decrease in effectiveness when used in hard water, for example, water containing more than 300 ppm calcium hardness. This is obviously a serious deficiency in attempting to obtain higher concentration factors in cooling systems. The aim of the present invention is to provide a method which is more effective in preventing deposition in hard water than those currently available.

According to the present invention it has surprisingly been found that this can be achieved by the use of a specific combination of a specific phosphonate, viz., 2-phosphonobutane-1,2,4-tricarboxylic acid, and certain water-soluble organic copolymers. It has been found that the use of this combination of phosphonate and copolymer results in a synergistic effect in spite of the fact that the individual components are adversely affected when used in hard water.

Accordingly, the present invention provides a method of treating water, in particular to reduce or prevent the deposition of solid material in cooling water systems, which comprises incorporating in the water, 2-phosphonobutane-1,2,4-tricarboxylic acid and a water soluble organic copolymer possessing carboxylic (including carboxylic anhydride) and sulphonate groups.

While it is possible to incorporate the phosphonate and copolymer separately it will be appreciated that it will generally be more convenient to incorporate them together in the form of a composition. Accordingly, the present invention also provides a composition suitable for addition to water to reduce or prevent deposition of solid material therein, comprising the aforesaid phosphonate and copolymer, as defined below.

In general, the copolymers used in the present invention are vinyl addition type copolymers possessing recurring units of the formula:

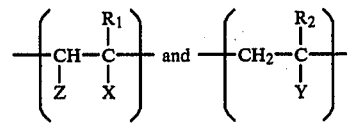

wherein $R_1$ represents hydrogen or lower alkyl i.e. of 1 to 6 carbon atoms preferably 1 to 4 carbon atoms, or $-CH_2COOH$, $R_2$ represents hydrogen or lower alkyl, X represents $-COOH$, Z represents hydrogen or $-COOH$, or X and Z together represent $-CO-O-CO-$, and Y represents $-SO_3H$, $-C_6H_4SO_3H$ (para) or $CONHQSO_3H$ in which Q represents $-CH_2-$ or $-CH_2-CH_2-$, optionally substituted by $R_3$ and/or $R_4$, in which $R_3$ and $R_4$, independently, represent hydrogen, phenyl, substituted phenyl, $C_{1-12}$ linear or branched alkyl or $C_{3-12}$ cycloalkyl, especially methyl. Preferred such radicals include $-CONH-C(CH_3)(R_3)-CH_2-SO_3H$, especially where $R_3$ represents methyl, and $-CONHCH_2SO_3H$.

The phosphonate and copolymers are generally used in the form of alkali metal, especially sodium or potassium, ammonium, or lower amine salts although the use of the free acids, zinc or other salts of either or both is not excluded.

The molar proportion of the two types of recurring unit in the copolymer is generally from 5:95 to 95:5, more particularly from 25:75 to 75:25 and especially about 50:50. The copolymers generally possess a molecular weight from 500 to 750,000 and in particular from 1,000 to 10,000 and especially from 4,000 to 6,000. It will be appreciated that if the molecular weight of the copolymer is too high it tends to behave as a flocculating agent but this is not necessarily disadvantageous provided the flocculated material is sufficiently light to remain in suspension.

Preferred copolymers for use in the present invention include a copolymer of methacrylic acid and 2-acrylamido-2-methylpropane sulphonic acid (AMPS) in the form of, in particular, the sodium salt, especially in a molar ratio of about 1:1 and having a molecular weight of about 5,000, and a copolymer of styrene sulphonic acid and maleic acid in the form of, in particular, the sodium salt, especially in a molar ratio of about 3:1 and having a molecular weight of about 4,500.

The first units of the copolymers are generally derived from ethylenically unsaturated acids such as maleic acid (or anhydride), acrylic acid and methacrylic acid. The second units of the copolymers are generally derived from ethylenically unsaturated monomers; these monomers may either contain the sulphonate group or this group can be introduced by sulphonation of the copolymer.

The polymers used in the present invention can be obtained from the monomers using conventional polymerization processes. The styrene sulphonate polymers can be prepared by sulphonating a copolymer of styrene and maleic anhydride with a sulphur trioxide-organic phosphorus compound (see, for example, U.S. Pat. No. 3,072,618).

In general the copolymer and phosphonate are used in the weight ratios from 10:1 to 1:10, more especially from 4:1 to 1:4 and most especially about 1:1.

The dosage of phosphonate and copolymer depends, to some extent, on the nature of the aqueous system to be treated. Thus the phosphonate dosage depends to some extent on the calcium concentation while the copolymer dosage depends to some extent on the concentration of suspended solids. In general, however, it can be said that the concentration in the feed is from 0.01 to 500 ppm of additive and, more particularly, from 0.1 to 50 ppm. A particularly preferred concentration is about 2.0 ppm. However, the optimum concentration used must depend on the degree of build-up in the system.

It will be appreciated that other ingredients customarily employed in water treatment such as alkali, lignin derivatives, biocides and corrosion inhibitors can also be employed.

The composition of the present invention will normally be in the form of an aqueous solution although other forms such as powders are not excluded.

The following Examples further illustrate the present invention. In these Examples two different types of tests were employed, namely a static test and a circulatory test. The details of these are as follows:

(i) In the static cylinder type test a suspension of graded particle size is allowed to stand for 24 hours in 250 ml measuring cylinders. The height of the solid/liquid interface is noted and the "% Hold Up" is calculated by dividing final height by original height, expressed as a %.

(ii) A laboratory scale recirculating rig consisting of a centrifugal pump, a 5-liter vessel and a flow through cell for monitoring the optical transmission of a suspension under standard conditions. The light transmission decreases with the better dispersion of the particulate matter in suspension.

EXAMPLES 1 TO 9

These Examples show the effect of water containing varying degrees of calcium hardness on a number of additives, using the static test and a suspension of 1000 ppm China Clay.

The results obtained are shown in Table 1.

TABLE I

| Example No. | Additive | Dose, ppm | Interface % Hold Up 100 ppm $Ca^{2+}$ water | 300 ppm $Ca^{2+}$ water |
|---|---|---|---|---|
| 1 | Blank | — | 0 | 0 |
| 2 | Polymer 1 | 5 | 70 | 0 |
| 3 | Polymer 2 | 5 | 71 | 0 |
| 4 | Polymer 3 | 5 | 72 | 0 |
| 5 | Polymer 4 | 5 | 69 | 0 |
| 6 | Polymer 5 | 5 | 69 | 30 |
| 7 | Polymer 6 | 5 | 70 | 37.5 |
| 8 | Polymer 7 | 5 | 68 | 15 |
| 9 | Phosphonate 1 | 5 | 60 | 0 |

Polymer 1 = Sodium polyacrylate M Wt 2000
2 = Sodium polyacrylate M Wt 5000
3 = Sodium polymethacrylate M Wt 1000
4 = Sodium polymethacrylate M Wt 4500
5 = Copolymer of methacrylic acid/2 acrylamide 2 methyl propane sulphonic acid in 3:2 mole ratio
6 = Copolymer as in 5 but in a 1:1 mole ratio
7 = Sodium polystyrene sulphonate, M Wt 70 000
Phosphonate 1 = Nitrilotrismethylene phosphonic acid (as sodium salt)

The above results show the serious effect of calcium hardness on the performance of some standard materials currently employed for dispersing particulate matter in cooling water systems. Although the copolymers 5, 6, and 7 give the best results, the deterioration in performance in hard water is still extremely undesirable. This test is severe but does indicate relative strength and weaknesses on a comparative basis.

EXAMPLES 10 TO 13

The results in Table II were obtained using the re-circulating rig after 5 hours using water containing 90 ppm China Clay Solids Suspension. They again indicate that the results in Table I are not due to the method of test.

TABLE II

| Example No. | Additive | Dose, ppm | % Transmission in 100 ppm $Ca^{2+}$ water | 300 ppm $Ca^{2+}$ water |
|---|---|---|---|---|
| 10 | Blank | — | 55 | 60 |
| 11 | Polymer 6 | 5 | 33 | 36.4 |
| 12 | Polymer 8 | 5 | 36.5 | 40.0 |
| 13 | Phosphonate 2 | 5 | 34.0 | 48.0 |

Polymer 6 = Copolymer of methacrylic acid/2 acrylamide 2-methyl propane sulphonic acid 1:1 mole ratio
Polymer 8 = Sodium polyacrylate M Wt 1000
Phosphonate 2 = 2-phosphonobutane -1,2,4-tricarboxylic acid

EXAMPLES 14 TO 24

Table III gives the results of a number of tests run on the recirculating rig in order to ascertain the effect of adding a phosphate to the polymer in question.

TABLE III

| Recirculating rig | 90 ppm China Clay Solids Suspension |
| Duration of test | 5 hours Dose level of additive 5 ppm in all cases, 300 ppm $Ca^{2+}$ hardness water |

| Example No. | Additive | % Transmission |
|---|---|---|
| 14 | Blank | 60 |
| 15 | Polymer 6 | 36.3 |
| 16 | Phosphonate 2 | 48.0 |
| 17 | 4/1 ratio Polymer 6/Phosphonate 2 | 34.0 |
| 18 | 1/1 ratio Polymer 6/Phosphonate 2 | 31.5 |
| 19 | 1/4 ratio Polymer 6/Phosphonate 2 | 34.2 |
| 20 | Phosphonate 1 | 50.0 |
| 21 | 1/1 ratio Polymer 6/Phosphonate 1 | 40.2 |
| 22 | 1/1 ratio Polymer 8/Phosphonate 2 | 51.0 |
| 23 | Polymer 9 | 40.8 |
| 24 | 1/1 ratio Polymer 9/Phosphonate 2 | 38.4 |

Polymer 9 = Copolymer of Styrene sulphonate/Maleic acid in ratio 3:1 Molecular Wt. 4 500

These results show the synergistic effect of using the inventive phosphonate with the inventive polymers.

EXAMPLES 25 TO 29

A static cylinder test was conducted using a 100 ppm suspension of China Clay in 300 ppm $Ca^{2+}$ hardness water. The suspension in 250/ml measuring cylinders was allowed to settle for two hours, samples were then withdrawn at a given depth and the turbidity measured by a nephelometer. The efficiency of the additive as a dispersant was calculated from:

$$\frac{\text{Final reading of additive} - \text{Final reading of blank}}{\text{Initial reading of blank} - \text{Final reading of blank}} \times 100 = \% \text{ efficiency}$$

| Test | Additive | Dose level, ppm | Efficiency % |
|---|---|---|---|
| 25 | Polymer 6 | 5 | 33.1 |
|  | Phosphonate 2 | 5 | 19.2 |
|  | 1:1 ratio Polymer 6/Phosphonate 2 | 5 | 42.6 |
| 26 | Polymer 6 | 5 | 33.0 |
|  | Phosphonate 3 | 5 | 25.0 |
|  | 1:1 ratio Polymer 6/Phosphonate 3 | 5 | 21.0 |
|  | Phosphonate 1 | 5 | 16.6 |
|  | 1:1 ratio Polymer 6/Phosphonate 1 | 5 | 27.1 |
| 27 | Polymer 6 | 5 | 29.2 |
|  | Phosphonate 4 | 5 | 25.2 |
|  | Phosphonate 5 | 5 | 10.4 |
|  | 1:1 ratio Polymer 6/Phosphonate 4 | 5 | 10.6 |
|  | 1:1 ratio Polymer 6/Phosphonate 5 | 5 | 20.8 |
| 28 | Polymer 6 | 5 | 31.8 |
|  | Phosphonate 6 | 5 | 17.3 |
|  | 1:1 ratio Polymer 6/Phosphonate 6 | 5 | 27.3 |
| 29 | Polymer 6 | 5 | 32.7 |
|  | Phosphonate 7 | 5 | 6.0 |
|  | 1:1 ratio Polymer 6/Phosphonate 7 | 5 | 17.7 |

Phosphonate 3 = Hexamethylene diamine tetramethylene phosphonic acid.
Phosphonate 4 = N,N—bis(carboxymethyl)imino methylene phosphonic acid.
Phosphonate 5 = N,carboxymethyl imino di(methylene phosphonic acid).
Phosphonate 6 = N,carboxymethyl imino monomethylene phosphonic acid.
Phosphonate 7 = Hydroxyethylidene diphosphonic acid.

It can be seen that only phosphonate 2, 2-phosphonobutane-1,2,4-tricarboxylic acid, gives a synergistic effect.

We claim:

1. Method of suspending sediment in cooling water systems that comprises adding thereto 2-phosphonobutane-1,2,4-tricarboxylic acid and a copolymer of methacrylic acid and 2-acrylamido-2-methylpropane sulfonic acid in a molar ratio of about 1:1 or a copolymer of styrene sulfonic acid and maleic acid in a molar ratio of about 3:1, said copolymer having a molecular weight of from about 4,000 to 6,000 and said 2-phosphonobutane-1,2,4-tricarboxylic acid and copolymer being added in a respective weight ratio of about 4:1 to 1:4 and in a total dosage of about 0.1 to 50 ppm.

2. Method according to claim 1 in which the copolymer is said copolymer of methacrylic acid/2 acrylamido 2 methyl propane sulfonic acid.

3. Method according to claim 2 in which the copolymer has a molecular weight of about 5,000.

4. Method according to claim 1 in which the copolymer is said copolymer of styrene sulfonic acid and maleic acid.

5. Method according to claim 4 in which the copolymer has a molecular weight of about 4,500.

6. Method according to claim 1 in which the 2-phosphonobutane-1,2,4-tricarboxylic acid and the copolymer are added in a respective weight ratio of about 1:1.

* * * * *

UNITED STATES PATENT AND TRADEMARK OFFICE
CERTIFICATE OF CORRECTION

PATENT NO. : 4,432,879

DATED : Feb. 21, 1984

INVENTOR(S) : Brian Greaves; Paul Ingham

It is certified that error appears in the above-identified patent and that said Letters Patent is hereby corrected as shown below:

Column 4, line 47; delete the word "phosphate" and substitute --phosphonate--.

Signed and Sealed this

Nineteenth Day of November 1985

[SEAL]

Attest:

DONALD J. QUIGG

Attesting Officer

Commissioner of Patents and Trademarks